April 21, 1959 N. KIRK 2,883,272
APPARATUS FOR THE CONTINUOUS POLYMERIZATION
OF ORGANOPOLYSILOXANES
Filed Sept. 13, 1955
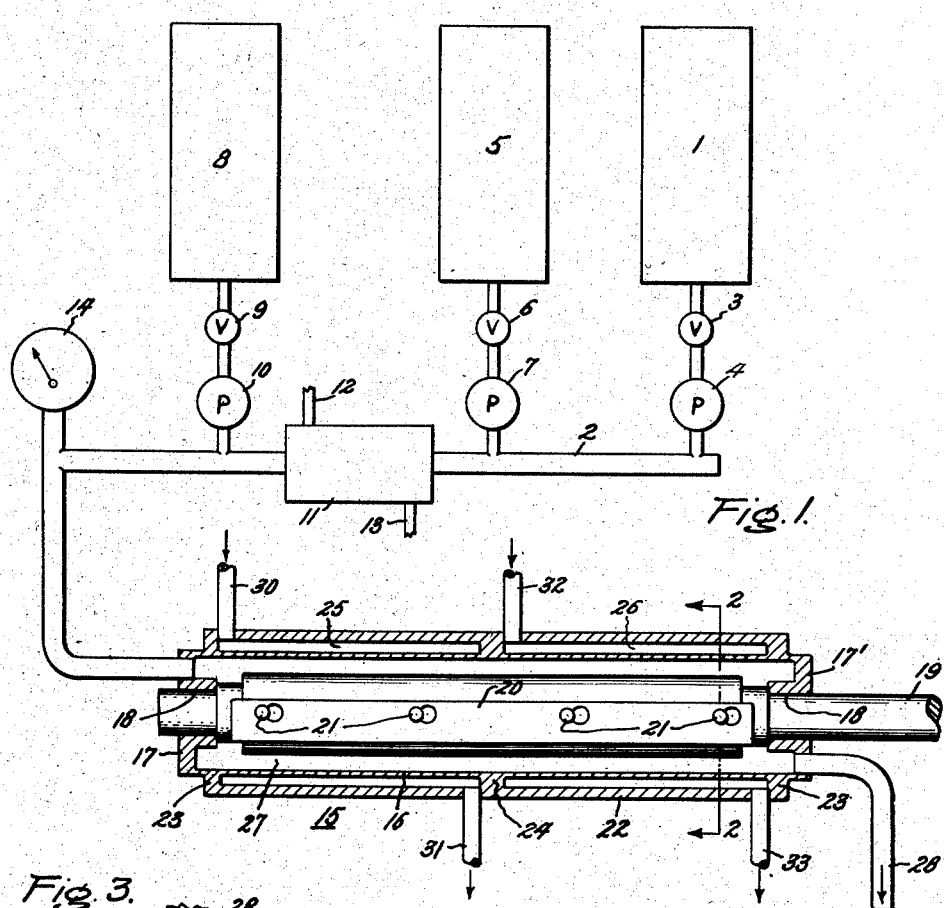
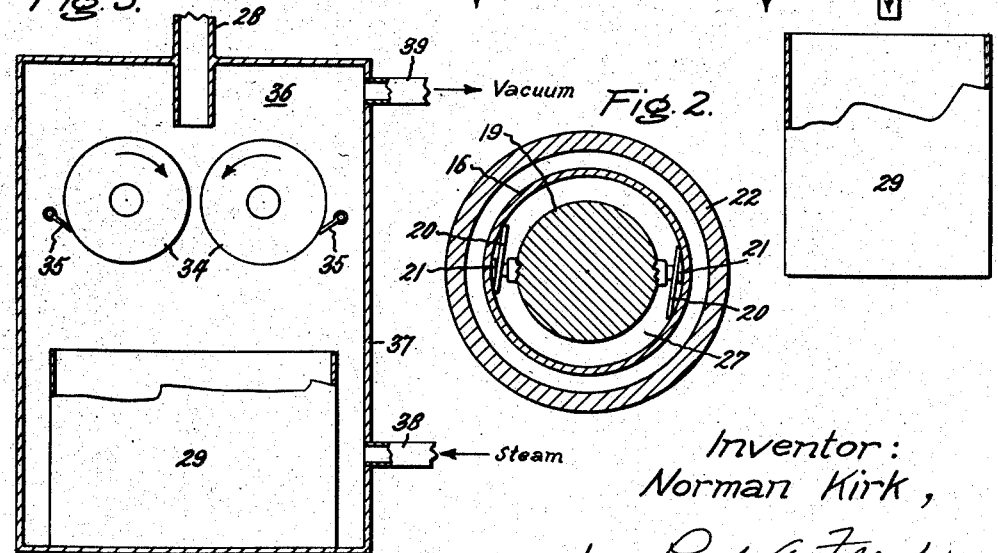
Inventor:
Norman Kirk,
by Paul A. Frank
His Attorney.

United States Patent Office 2,883,272
Patented Apr. 21, 1959

2,883,272

APPARATUS FOR THE CONTINUOUS POLYMERIZATION OF ORGANOPOLYSILOXANES

Norman Kirk, Schenectady, N.Y., assignor to General Electric Company, a corporation of New York Application September 13, 1955, Serial No. 534,056

3 Claims. (Cl. 23—260)

This invention relates to apparatus for the continuous polymerization of organopolysiloxanes. More particularly, this invention is concerned with apparatus including a scraped surface heat exchanger for the polymerization of low molecular weight organopolysiloxanes to high molecular weight organopolysiloxanes.

One of the ingredients employed in the preparation of high molecular weight cross-linked elastic organopolysiloxanes (silicone rubbers) is a high molecular weight non-cross-linked organopolysiloxane commonly referred to as an organopolysiloxane gum. This gum in turn is prepared by a well known chemical method which comprises heating a low molecular weight organopolysiloxane such as octamethylcyclotetrasiloxane, hereinafter referred to as "tetramer" in the presence of a suitable organopolysiloxane polymerization catalyst and in the presence or absence of a suitable chain-stopping organopolysiloxane (sometimes referred to as "chain-stopper") such as hexamethyldisiloxane or other low molecular weight chain-stopped linear silicone oils. Among the organopolysiloxane polymerization catalysts (also referred to as rearrangement and condensation catalysts) commonly employed in forming silicone gums may be mentioned the alkali metal hydroxides such as sodium hydroxide, potassium hydroxide, cesium hydroxide, etc., and the so-called transient organopolysiloxane polymerization catalysts such as the solid quaternary ammonium hydroxides described in the application of Simon W. Kantor, Serial No. 429,132, filed May 11, 1954, and now abandoned, and the quaternary phosphonium hydroxides and alkoxides described in the application of Simon W. Kantor and Alfred R. Gilbert, Serial No. 494,596, filed December 10, 1954, both of the aforementioned applications being assigned to the same assignee as the present invention. Among the transient organopolysiloxane polymerization catalysts described in these aforementioned applications are included, for example, tetramethyl ammonium hydroxide, tetrabutyl phosphonium hydroxide, tetraoctyl phosphonium hydroxide, etc.

In the conventional processes for preparing organopolysiloxane gums, a batch process is used which comprises mixing the low molecular weight organopolysiloxanes and the catalyst and heating the mixture to a suitable temperature, such as, for example, from 100–150° C., while stirring the ingredients to insure as much uniformity of temperature and composition as is possible. Although satisfactory organopolysiloxane gums are generally prepared by these processes, it is found that the maintenance of a uniform temperature and composition throughout the batch being polymerized is extremely difficult because of the high molecular weights found in the batch prior to completion of the polymerization reaction. Thus, it is found that with a batch of approximately 1000 pounds the power required to obtain even superficial mixing of the batch is on the order of 25 to 30 horsepower applied to the stirrer. During the batch process the stirrer invariably stalls during the intermediate stages of the polymerization since the viscosity of the material being polymerized reaches such a high value that the power applied to the stirrer is insufficient to overcome the internal viscosity of the silicone material. Since the stirrer commonly stalls prior to the end of the reaction, it is necessary to maintain the organopolysiloxane at the polymerization temperature for a further period of time without further stirring. This leads to organopolysiloxanes which vary from batch to batch in uniformity and which contain the polymerization catalyst trapped in the gum.

An object of the present invention is to provide a continuous method for the polymerization of relatively low molecular weight organopolysiloxanes to high molecular weight organopolysiloxanes.

A further object of the present invention is to provide apparatus for the polymerization of low molecular weight organopolysiloxanes to high molecular weight organopolysiloxanes which employs a scraped surface heat exchanger in place of the stirrer in a batch kettle as formerly employed.

A still further object of the present invention is to provide a continuous process for the polymerization of organopolysiloxanes which employs a scraped surface heat exchanger and which provides a uniform product containing no active catalysts at the end of the process.

These and other objects of my invention are accomplished by providing means for feeding the low molecular weight organopolysiloxane to a scraped surface heat exchanger, means for polymerizing said low molecular weight organopolysiloxane in said heat exchanger, and means for deactivating the organopolysiloxane polymerization catalyst after the polymerization is completed.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing in which Fig. 1 is a polymerization apparatus constructed in accordance with my invention;

Fig. 2 is a sectional view of the apparatus along the line 2—2; and

Fig. 3 shows a portion of a modified apparatus used for deactivating the polymerization catalyst and devolatilizing the gum.

In Fig. 1 is shown a source or tank 1 for the storage of octamethylcyclotetrasiloxane connected to feed line 2 through a suitable valve 3 and metering pump 4. Source or tank 5 which can contain a suitable low molecular weight organopolysiloxane containing monofunctional units such as hexamethyldisiloxane, or decamethyltetrasiloxane is connected to feed line 2 through a suitable valve 6 and metering pump 7. Source or tank 8 contains a suitable transient organopolysiloxane polymerization catalyst, preferably as an organopolysiloxane solution of said catalyst and is connected to feed line 2 through a suitable valve 9 and metering pump 10. A heat exchanger 11 is provided in feed line 2 at a portion of the line between tank 5 and tank 8. Heat exchanger 11 has an inlet 12 and an outlet 13 for the circulation of a suitable heat transfer fluid such as steam or hot oil or other heat transfer media. A pressure gauge 14 is connected to feed line 2 to indicate the pressure at which the polymerizable mixture enters scraped-surface heat exchanger 15.

Scraped-surface heat exchangers are commercially available, a typical exchanger being the Votator scraped-surface heat exchanger manufactured by the Votator Division, Girdler Co., Louisville Kentucky. These scraped-surface heat exchangers comprise a cylinder 16 whose length to diameter ratio is high, end plates 17 and 17' defining a bearing surface 18, with a shaft 19 mounted inside of cylinder 16 by bearings 18. Shaft 19 has adjustably mounted thereon scrapers or "doctor blades" 20 by suitable adjusting means 21. A second cylinder 22 is mounted outside of and concentric with cylinder 16 and sealed at its extremities 23 by suitable means. Baffle 24 is located between cylinders 16 and 22 so as to define two annular chambers 25 and 26 between said cylinders. Feed line 2 is connected to the annular area 27 between cylinder 16 and shaft 19 and outlet 28 is connected to area 27 through end plate 17'. Line 28 is located adjacent collecting vessel 29. A suitable variable speed or constant speed drive (not shown) is connected to rotatable shaft 19. An inlet 30 and an outlet 31 are provided for chamber 25 for the admission of steam or other heat transfer medium to heat the organopolysiloxanes within chamber 27 to the temperature necessary to cause the polymerization. Inlet 32 and outlet 33 are provided in chamber 26 to supply steam or other heat transfer fluid to chamber 26 so that that portion of chamber 27 adjacent chamber 26 may be heated to a temperature sufficiently high to inactivate the catalyst used in the polymerization of the organopolysiloxane to a gum.

In the operation of the continuous polymerization apparatus of Figs. 1 and 2 a supply of tetramer is metered into feed line 2 from tank 1 through metering pump 4. At the same time a supply of chain-stopper is metered from tank 5 into feed line 2 by metering pump 7. As the tetramer and chain-stopper pass through heat exchanger 11 the mixture is heated to a temperature of about 100–110° C. by steam entering the heat exchanger 11 through line 12 and leaving through line 13. Catalyst is metered into the hot mixture from tank 8 through metering pump 10 into line 2 in an amount suitable to cause the polymerization. In practice the polymerization catalyst employed is preferably the tetra-n-butyl phosphonium hydroxide described in the aforementioned Kantor and Gilbert application. By adjusting the feed rate of pumps 4, 7 and 10, the composition of the polymerizable mixture in feed line 2 may be changed to control the chain length of the polymerized organopolysiloxane and to change the time required for the polymerization. Thus, as the ratio of tetramer to chain-stopper increases, the chain length of the polymerized product also increases. As the concentration of polymerization catalyst increases, the time required for the polymerization decreases. As the polymerizable mixture enters the scraped-surface heat exchanger 15 through feed line 2, the shaft 19 is rotated at a speed which may vary from 50 to 500 or more r.p.m. The doctor blades 20 on the shaft 19 are adjusted so that they are as close as possible to the inner wall of chamber 16 without having any metal contact between the scraper blades and the inner wall of the cylinder. Rotation of shaft 19 and scraper blades 20 insures that the residence time of all portions of the polymerizable material is the same throughout all portions of the scraped-surface heat exchanger, i.e. there is essentially "plug" flow through the heat exchanger. In operation of the scraped surface heat exchanger, steam at about 110° C. is admitted to chamber 25 through inlet 30 and outlet 31. This steam heats up or keeps the polymerizable mixture at about 110° C. in the portion of chamber 27 adjacent chamber 25 and causes polymerization of low molecular weight polymerizable mixture to a high molecular weight product. Although the preferred steam temperature in chamber 25 is 110° C., this temperature may vary within wide limits as long as the temperature is sufficient to cause polymerization of the organopolysiloxane but insufficient to cause decomposition of the catalyst. Generally a temperature of 80–120° C. is satisfactory. As the pressure induced by metering pumps 4, 7 and 10 forces the organopolysiloxane through the heat exchanger 15 from inlet end plate 17 toward outlet end plate 17', the organopolysiloxane which is completely polymerized passes from that portion of chamber 27 adjacent chamber 26 to that portion of chamber 27 adjacent chamber 26. Steam which enters chamber 26 through inlet 32 and outlet 33 heats the organopolysiloxane to a temperature sufficient to cause decomposition of the catalyst. At temperatures above about 130° C. e.g., from 130–300° C., the organopolysiloxane polymerization catalyst is decomposed into products which have no further effect on the rearrangement or polymerization of organopolysiloxanes. Thus, as the polymerized organopolysiloxane leaves chamber 27 through exit 28 a uniform stable product is formed. This product may then be collected in vessel 29 for later incorporation into silicone rubber compositions.

In the polymerization of organopolysiloxane from low molecular weight to high molecular weight materials, it is found that an equilibrium exists which causes about 12 to 15 percent by weight of the low molecular weight materials to remain in a relatively low molecular weight form. Since it is desirable that this low molecular weight material be removed prior to incorporation of the high molecular weight material into silicone rubbers, it is common to devolatilize silicone gums so that only relatively high molecular weight materials remain. In devolatilizing these high molecular weight materials, relatively high temperatures are generally used which are sufficient to cause deactivation of the catalyst employed for the polymerization. Because of this, it is possible to combine the deactivation and the devolatilization into one step.

In Fig. 3 is shown an apparatus which is employed for the combined deactivation and devolatilization steps. This apparatus comprises a pair of rolls 34 driven in opposite directions by any suitable means (not shown) with the clearance between the rolls being adjustable and with conventional doctor blades 35 associated with rolls 34. The two rolls are heated by any suitable means (not shown) such as by steam or oil circulating through the interior of the rolls. These rolls are placed in a chamber 36 defined by a gas-tight housing 37. Located beneath the rolls 34 is a collecting vessel 29. Housing 37 has a line 38 for the admission of steam and a line 39 for maintaining a vacuum within the housing. When using the apparatus of Fig. 3 for the combined deactivation of catalyst and devolatilization of the product it is not necessary to provide means for the deactivation in the scraped heat exchanger 15. Therefore, when using the apparatus of Fig. 3, baffle 24, inlet 32 and outlet 33 may be eliminated from the heat exchanger or the temperature of the steam supplied to both chambers 25 and 26 may be the same. Under these circumstances, the polymerized product leaving the heat exchanger through line 28 still retains the polymerization catalyst in its active form and contains an equilibrium mixture of low molecular weight and high molecular weight organopolysiloxanes. Line 28 then directs the polymerized gum into housing 37 and onto heated rolls 34. As the polymerized product passes over rolls 34, the heat of the rolls causes deactivation of the catalyst and volatilization of the low molecular weight material. Steam which enters housing 37 through line 38 purges the volatilized material which is drawn off through vacuum line 39. The devolatilized, catalyst-inactivated product is then collected in vessel 29 for later incorporation into silicone rubbers and for other applications.

In a typical run an organopolysiloxane solution of tetra-n-butyl phosphonium hydroxide is prepared by evacuating an aqueous solution of tetra-n-butyl phosphonium hydroxide and octamethylcyclotetrasiloxane at a temperature of about 25° C. This results in an anhydrous solution of tetra-n-butyl phosphonium hydroxide containing about 40 percent by weight of the hydroxide based on the weight of the mixture. This catalyst solution is charged to tank 8. Tank 1 is charged with tetramer and tank 5 is charged with decamethyltetrasiloxane. The drive for shaft 19 is started and adjusted so that the shaft makes approximately 100 revolutions per minute. Steam at 110° C. is circulated through chamber 25 and steam at approximately 170° C. is circulated through chamber 26. Pumps 4, 7 and 10 are then adjusted to supply a mixture to feed line 2 containing about 99.945 parts of tetramer, 0.03 part by weight of decamethyltetrasiloxane, and about 0.025 part by weight of tetra-n-butyl phosphonium hydroxide solids. This mixture is supplied to feed line 2 in sufficient quantity so that the residence time of each particle of material in chamber 27 is about 18 minutes. After steady state operation is attained, gum leaves chamber 27 through line 28 and is collected in vessel 29. This gum has a viscosity in excess of about 10,000,000 centipoises and contains about 12 percent of volatiles.

In another typical run using the modified apparatus including the drum drier of Fig. 3 with chambers 25 and 26 maintained at the same temperature with steam at 110° C. the following procedures were employed. Pumps 4, 7 and 10 were adjusted to give 99.94 parts of tetramer, 0.04 part by weight of decamethyltetrasiloxane, and 0.02 part by weight of tetra-n-butyl phosphonium hydroxide in sufficient quantity to give a residence time in chamber 27 of 16 minutes. After steady state conditions had been obtained, the gum flowing out of chamber 27 through line 28 was introduced into area 36 at a point above the rotating drums 34. The clearance between the drums was approximately 20 mils and the drums were rotating at a speed of about ¾ revolution per minute (80 sec. per revolution) at a temperature of about 280° C. which was obtained by passing hot oil through the interior of the rolls. At the same time steam at 110° C. was introduced through line 38 to sweep from space 36 all volatiles removed from the gum. Space 36 was maintained at a pressure of about 5 mm. Hg through vacuum line 39. After passing through the area between rolls 34, the deactivated and devolatilized product was collected in vessel 29. Examination of this product showed it to be a colorless gum having a viscosity of about 25,000,000 centipoises.

In employing the apparatus of the present invention, it has been found that a wide variety of feed compositions and feed rates may be employed. For example, the percentage of tetra-n-butyl phosphonium hydroxide employed as a catalyst may vary from about 0.001 to about 0.05 percent by weight based on the weight of the total feed. The percentage of chain-stopper can also vary within wide limits, for example, where decamethyltetrasiloxane is employed as a chain stopper, the amounts can vary from a trace up to about 10 percent by weight, depending on the chain length (viscosity) of the product desired. The rate of feed to the scraped-surface heat exchanger may also vary within wide limits, it being necessary only to insure that the catalyzed organopolysiloxane remains in the chamber 27 for sufficient time for the polymerization to occur. Generally, it has been found that residence times of at least 10 minutes are desirable to insure thorough and uniform polymerization of the mixture. There is no upper limit on the residence time of the mixture in chamber 27 since the polymerization reaction is an equilibrium reaction and the rate of reaction (and further polymerization) becomes negligible as the equilibrium composition is approached.

In addition to using the apparatus of the present invention to prepare high molecular weight silicone gums, the apparatus may also be employed to prepare silicone fluids of intermediate molecular weights such as silicone oils having viscosities of from about 350 centipoises up to about 100,000 or more centipoises. Thus, a methylsilicone oil having a viscosity of about 1900 centipoises was formed by adjusting pumps 4, 7 and 10 to provide a mixture containing 98.58 parts by weight of tetramer, 1.40 parts by weight of decamethyltetrasiloxane, and 0.02 part by weight of tetra-n-butyl phosphonium hydroxide at a rate such that the residence time of the mixture in chamber 27 was approximately 23 minutes. After passing through chamber 27, this fluid was directed onto rolls 34 by line 28. During this run, shaft 19 was rotated at a speed of 100 r.p.m. and rolls 34 were rotated at a speed of 2.4 r.p.m. while maintained at a temperature of about 280° C. Space 36 was purged with steam to entrain the volatiles removed from the oil. The system was maintained under a vacuum of about 30 mm. Hg.

In addition to providing a continuous supply of one type of product, it should be understood that the apparatus of the present invention may be used to produce a variety of different types of products without shutdown. This is done while the apparatus is running by changing the relative feed rates of the materials through pumps 4, 7 and 10. Thus, while the apparatus is on stream producing a high molecular weight gum the rate of feed of decamethyltetrasiloxane will be sufficient to supply about 0.03 percent by weight of the compound in feed line 2. During the course of the run the amount of this compound can be increased to such an extent that the composition in the feed line goes to about 1.40 weight percent of decamethyltetrasiloxane by adjusting pump 7. This will change the product from a heavy gum having a viscosity in excess of 20,000,000 centipoises to an intermediate molecular weight fluid having a viscosity of about 1900 centipoises. This change, of course, is gradual and occurs only after sufficient material of the new composition has been passed through chamber 27 so that steady state conditions are again obtained.

Although the apparatus of the present invention has been described only in connection with a particular catalyst, namely, tetra-n-butyl phosphonium hydroxide, it should be understood that the apparatus may be employed with any type of organopolysiloxane polymerization catalyst whether the catalyst be of a type such as a metal hydroxide or of a transient type catalyst which may be decomposed after the polymerization has taken place. I prefer to use such a transient catalyst so that the product may be deactivated either in the scraped-surface heat exchanger as shown in Fig. 1 or in a drum drier as shown in Fig. 3. Where a transient catalyst is employed, the product may be subjected to atmospheric humidity without any danger of the humidity causing the reversion of the high molecular weight material back to an intermediate molecular weight or low molecular weight form. Although specific illustrations of only one transient organopolysiloxane polymerization catalyst have been given, it should be understood that any of the transient catalysts described in the aforementioned Kantor application or the aforementioned Kantor and Gilbert application may be employed equally as well. In addition, any other organopolysiloxane polymerization catalyst which can be decomposed by heat after the polymerization is completed may also be employed.

Although the apparatus of the present invention has been described with reference to three tanks for supplying three separate ingredients to feed line 2, it should be understood that for some applications, there is no need for including a chain-stopper into the polymerizable mixture and therefore tank 5, valve 6, and metering pump 7 may be eliminated from the apparatus. In other cases, it may not be necessary to provide separate sources for the various ingredients which go into feed line 2. In these cases, as many ingredients as desired may be incorporated into one of the feed tanks and any unused feed tanks may be eliminated from the system by merely closing whichever valve or valves selected from valves 3, 6 or 9 are not in use. Thus, it is entirely possible to combine the tetramer, the chain-stopper and the tetra-n-butyl phosphonium hydroxide into one tank in the proper proportions and feed the material from this one tank into chamber 27 through feed line 2.

While the present invention has been shown in several modifications, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What I claim as new and desire to secure by Letters Patent of the United States is:

1. Apparatus for the continuous polymerization of low molecular weight organopolysiloxanes to high molecular weight organopolysiloxanes comprising sources of low molecular weight organopolysiloxane and polymerization catalyst, means for heating said low molecular weight organopolysiloxane prior to mixing with the polymerization catalyst, conduit means for conveying the mixture of the organopolysiloxane and catalyst to a scraped-surface heat exchanger, a scraped-surface heat exchanger chamber containing a partitioned heating means whereby one section of the heat exchanger chamber is maintained at a temperature of from 80° to 120° C., and a second section of the heat exchanger chamber is maintained at a temperature above about 130° C., and means for conveying said low molecular weight organopolysiloxane and polymerization catalyst through the heated section of said heat exchanger, said heat exchanger comprising a cylindrical heat transfer surface, a rotatable shaft spaced from and mounted within said cylindrical heat transfer surface, and at least one scraper blade mounted on said shaft in a plane parallel to the axis of said shaft and adapted to scrape polymerizing organopolysiloxane from said heat transfer surface.

2. Apparatus for the continuous polymerization of low molecular weight organopolysiloxanes to high molecular weight organopolysiloxanes comprising sources of low molecular weight organopolysiloxane and polymerization catalyst, means for heating said low molecular weight organopolysiloxane prior to mixing with the polymerization catalyst, conduit means for conveying the mixture of the organopolysiloxane and catalyst to a scraped-surface heat exchanger, a scraped-surface heat exchanger chamber containing a partitioned heating means whereby one section of the heat exchanger chamber is maintained at a temperature of from 80° to 120° C., and a second section of the heat exchanger chamber is maintained at a temperature above about 130° C., means for conveying said low molecular weight organopolysiloxane and polymerization catalyst through the two heated sections of said heat exchanger, said heat exchanger comprising a cylindrical heat transfer surface, a rotatable shaft spaced from and mounted within said cylindrical heat transfer surface, and at least one scraper blade mounted on said shaft in a plane parallel to the axis of said shaft and adapted to scrape polymerizing organopolysiloxane from said heat transfer surface, a drum dryer, means for continuously conveying said high molecular weight organopolysiloxane from said heat exchanger to said drum dryer, and means for maintaining the surface of said drum dryer at a temperature above 130° C. sufficiently high to volatilize low molecular weight materials remaining in said high molecular weight organopolysiloxane.

3. Apparatus for the continuous polymerization of low molecular weight organopolysiloxanes to high molecular weight organopolysiloxanes comprising a source of octamethylcyclotetrasiloxane, means for continuously metering said octamethylcyclotetrasiloxane to a feed line, means for heating said metered octamethylcyclotetrasiloxane, a source of low molecular weight chain-stopped organopolysiloxane, means for continuously metering a predetermined amount of said chain-stopped organopolysiloxane to said feed line, a source of organopolysiloxane polymerization catalyst, means for continuously metering a predetermined amount of said catalyst to said feed line, conduit means for conveying the mixture of the octamethylcyclotetrasiloxane, the chain-stopped organopolysiloxane, and the organopolysiloxane polymerization catalyst to a scraped-surface heat exchanger, a scraped-surface heat exchanger chamber containing a partitioned heating means whereby one section of the heat exchanger chamber is maintained at a temperature of 80° to 120° C., and a second section of the heat exchanger chamber is maintained at a temperature above about 130° C., means for conveying said low molecular weight organopolysiloxane, chain-stopped organopolysiloxane and polymerization catalyst through the two heated sections of said heat exchanger, said heat exchanger comprising a cylindrical heat transfer surface, a rotatable shaft spaced from and mounted within said cylindrical heat transfer surface, at least one scraper blade mounted on said shaft in a plane parallel to the axis of said shaft and adapted to scrape polymerizing organopolysiloxane from said heat transfer surface, a drum dryer, means for heating the surface of said drum dryer to a temperature of from 130°–300° C., and means for continuously conveying said high molecular weight organopolysiloxane and said catalyst to the surface of said dryer so as to volatilize low molecular weight materials remaining in said high molecular weight organopolysiloxane.

References Cited in the file of this patent

UNITED STATES PATENTS

| | | |
|---|---|---|
| 1,211,252 | Sinclair | Jan. 2, 1917 |
| 1,847,149 | Vogt et al. | Mar. 1, 1932 |
| 1,993,264 | Duttweiler | Mar. 5, 1935 |
| 2,063,065 | Vogt et al. | Dec. 8, 1936 |
| 2,282,298 | Vogel | May 5, 1942 |
| 2,530,409 | Stober et al. | Nov. 21, 1950 |
| 2,665,197 | Rowland | Jan. 5, 1954 |